United States Patent

Alabone et al.

[11] 3,897,999
[45] Aug. 5, 1975

[54] FILM PROJECTOR EQUIPMENTS

[75] Inventors: Richard Phillips Alabone; Andrew Bretherton Frow, both of Essex, England

[73] Assignee: The Marconi Company Limited, Essex, England

[22] Filed: Feb. 15, 1974

[21] Appl. No.: 442,885

[30] Foreign Application Priority Data
Feb. 27, 1973 United Kingdom............ 9665/73

[52] U.S. Cl. .............. 352/27; 352/28; 352/29; 352/30
[51] Int. Cl.² .................................. G03B 31/02
[58] Field of Search ............ 352/27, 28, 29, 30

[56] References Cited
UNITED STATES PATENTS
1,811,365  6/1931  Owens ........................ 352/30
3,393,960  7/1968  Mindell et al. ................ 352/29

Primary Examiner—Monroe H. Hayes
Assistant Examiner—Russell E. Adams, Jr.
Attorney, Agent, or Firm—Baldwin, Wight & Brown

[57] ABSTRACT

A film projector having a revolving sound drum is provided with a pivotable roller arrangement for moving the film into and out of contact with the sound drum. The rollers are so arranged that the film path length between predetermined points on each side of the sound drum is substantially the same whether the film contacts the sound drum or whether the film is out of contact with the sound drum thereby ensuring that the film is not stretched when brought into contact with the sound drum.

4 Claims, 2 Drawing Figures

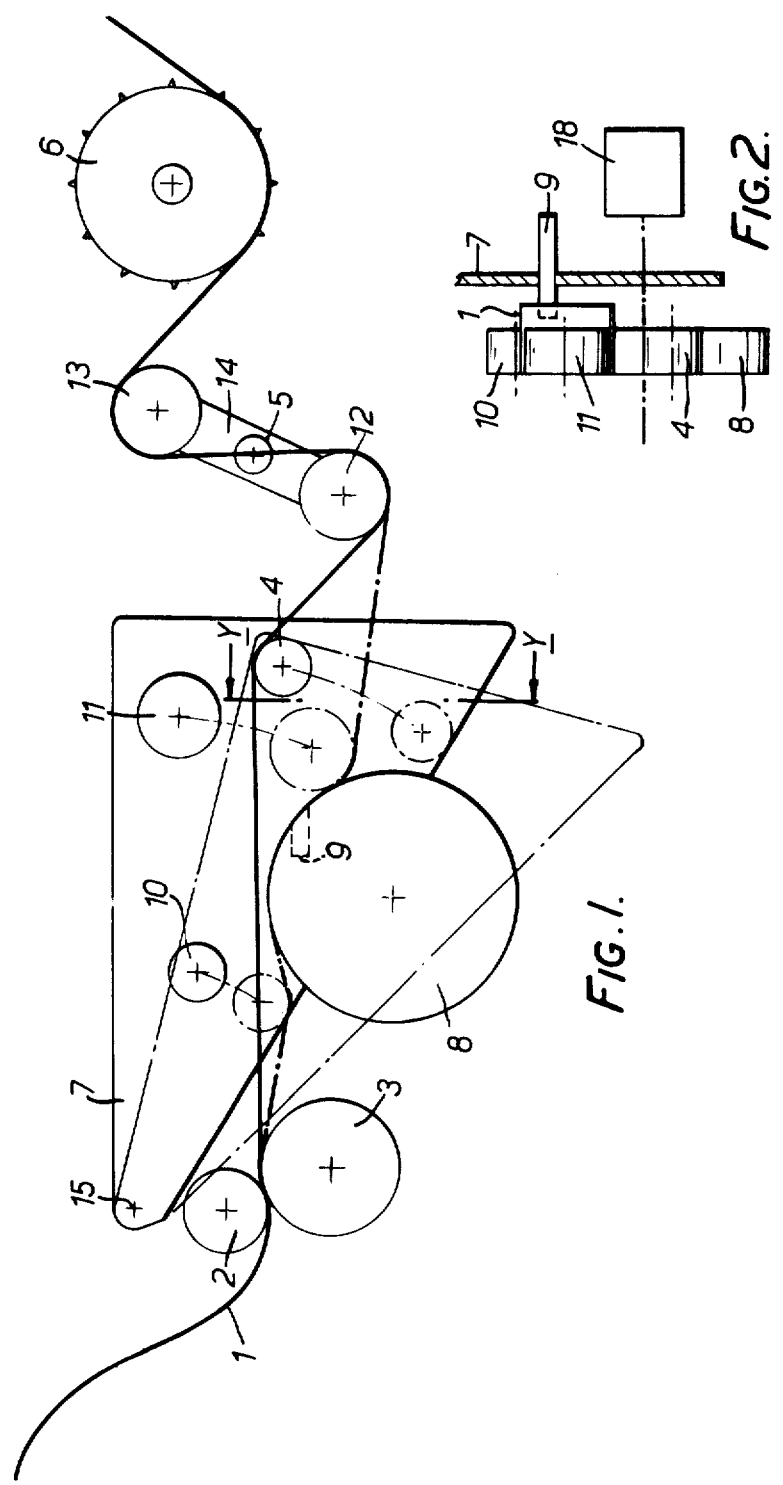

FILM PROJECTOR EQUIPMENTS

This invention relates to film projector equipment which term is intended to include within its ambit telecine film projector equipment.

It is known to provide a film projector equipment with a sound reproducing apparatus to convert magnetic sound information, provided at one side of the film strip, into audible sound. In one known sound reproducing apparatus, film is, in operation, wrapped around part of the circumference of a rotating sound drum such that the film overlaps one edge of the drum by approximately one eighth of an inch, the magnetic sound information being contained in the overlapping part of the film. Positioned beneath the film overlap and contacting the same side of the film as the sound drum is a stationary electro-magnetic reproducing head which converts the magnetic information on the film into electrical signals. In operation the sound drum, which has substantial inertia, rotates to transport the film past the reproducing head and to provide speed stability. However, when starting to rotate, the sound drum because of its relatively large inertia, takes a significant time (2 or 3 seconds) to reach its normal rotational speed. Thus if the film speed is tied to that of the sound drum when it is started, a poor standard of sound reproduction — commonly known as " wow" — is produced as the speed builds up slowly from zero. On the other hand, if the film in contact with the drum is clamped to prevent its movement while the sound drum is run-up to its normal operating speed then frictional damage is produced on the picture surfaces of the film by the drum being dragged thereagainst.

The present invention seeks to provide an improved film projector equipment.

According to this invention a film projector equipment includes a sound drum for transporting a film past a signal exchange region and means for moving said film into and out of contact with the sound drum while said sound drum is rotating.

Preferably the means for moving includes a pinch member for pinching the film into peripheral contact with the sound drum and a positioning means for contacting the film when said film is out of contact with said sound drum such that the film path length between two predetermined points on opposite sides of the drum is substantially the same whether or not the film is in contact with the sound drum.

Advantageously the film positioning means, the pinch member and the sound drum are arranged such that the film is wrapped around a part of the circumference of the sound drum.

Preferably the positioning means comprises two members, one of the members contacting the film only when the film is in contact with the sound drum, said one member being positioned on that side of the drum remote from the pinch member, and a further member contacting the film only when the film is out of contact with the drum, said second member being positioned on the same side of the drum as the pinch member.

Conveniently the pinch member, said one member and said second member are pivotally mounted rollers — all carried by a single member movable between two positions.

The invention will now be described, by way of example, with reference to the accompanying drawings in which:

FIG. 1 shows in schematic form a side view of a small portion of a telecine film projector equipment in accordance with the present invention in which a film is shown both in and out of contact with a sound drum, and FIG. 2 shows a sectionalised view taken along the line Y—Y in FIG. 1 when the film is in contact with the sound drum.

Refering to FIGS. 1 and 2, the apparatus shown therein is a part of equipment described in our copending U.S. application Ser. No. 442,633. As shown, a film 1 is laced between the two film guide rollers 2, 3 which frictionally pinch the film, over a roller 4, through a vibration damping device 5 and around a take-up sprocket 6. The roller 4, which is pivotally mounted on a plate 7, holds the film 1 out of contact with a sound drum 8 and an electro-magnetic reproducing head 9. Also pivotally mounted on the plate 7 but not in contact with the film 1 are a further roller 10 and a pinch roller 11. The plate 7 is itself pivoted about a fulcurm 15.

The damping device 5 which consists of two rollers 12, 13 pivotally mounted on a spring biassed, pivoted, arm 14 is employed to stop vibrations from the sprocket 6 from being transmitted to the reproducing head 9. It will be seen from FIG. 2 that a portion of the film 1 — that portion containing the sound information — overlaps the sound drum 8 and overlies the reproducing head 9.

In operation the sound drum 8 is run-up to its normal operating speed by a motor 18 and the film path is as shown by the solid line with the film stationary. When the sound drum 8 has attained its operating speed the plate 7 is driven by a solenoid (not shown) to pivot about fulcrum 15 so that roller 10 and pinch roller 11 are brought into contact with the film 1. The revised positions of the plate 7 and hence rollers 4, 10 and 11, and the film 1 are as shown by broken lines in FIG. 1, the path travelled by the plate 7 and rollers being shown by chain dotted lines. The film 1 is now pinched into contact with a part of the circumference of the sound drum 8 by the pinch roller 11 and constrained to wrap around a portion of the drum so that the film is driven past the reproducing head 9. Drive to the sound drum 8 from the motor 18 is now released and the film movement maintains the sound drum 8 in rotation.

The positions of the rollers 4, 10 and 11 on the plate 7 are arranged such that the film path length between rollers 2 and 3, and roller 12 is substantially the same whether or not the film 1 is out of contact with the sound drum 8 (as indicated by solid line) or in contact with the sound drum (as indicated by broken lines). The provision of substantially equal film path lengths has the advantage that when the film is brought into contact with the sound drum 8, the rollers 10 and 11 do not pull film either from between the rollers 2, 3 or displace the spring biassed damping device 5. If the rollers were to pull film as aforesaid (as is common in known projectors) then imbalance in the equipment would be produced resulting in "wow."

We claim:

1. In a film projection system having a sound drum, means for rotating the sound drum, means for translating a film strip past said sound drum, and means for maintaining the film strip taut between predetermined points on each side of the sound drum, an arrangement for urging the section of film between the said predetermined points into and out of contact with the sound drum, the arrangement comprising a carrier means movable between two end positions and abutment means on the carrier means for urging the said section of film towards and away from the sound drum, the disposition of the said abutment means being such that the section of film is taut in both end positions of the carrier mean and the lengths of the said section in the two end positions of the carrier means are substantially equal.

2. In a film projection system as defined in claim 1 wherein said means for maintaining the film strip taut comprises take-up means for moving the film in consonance with the rotational speed of the sound drum; a pair of pinch rolls disposed in spaced parallelism to said sound drum and between which the film is frictionally engaged, a damping roller disposed in spaced parallelism to said sound drum and disposed relative to said sound drum and said pinch rolls such that said sound drum lies between said pinch rolls and said damping roller, the film being engaged over said damping roller; said carrier means comprising a mounting member rotatably mounted remote from the axis of said sound drum and movable between first and second positions, and said abutment means including a pair of rollers carried by said mounting member and engaging the film in said first position to establish a predetermined non-rectilinear path length of film between said pinch rolls and said damping roller and a further roller carried by said mounting member and engaging the film in said second position to establish a non-rectilinear film path between said pinch rolls and said damping roller which is of said predetermined length.

3. In a film projection system according to claim 1 wherein the sound drum includes a sound reproducing head, and the abutment means comprise a pinch roller for pinching the film into contact with the said reproducing head, a supporting roller on the opposite side of the sound reproducing head from the pinch roller which is arranged to contact the section of film only when the section is in contact with the sound drum, and a further supporting roller on the sane side of the sound reproducing head as the pinch roller which is arranged to contact the section of film only when the section is out of contact with the sound drum.

4. In a film projection system according to claim 3 wherein the carrier means is a pivotally mounted plate member.

* * * * *